United States Patent [19]
Moreton et al.

[11] Patent Number: 5,403,653
[45] Date of Patent: Apr. 4, 1995

[54] REINFORCED ALLOY LAMINATES

[75] Inventors: Roger Moreton; Christopher J. Peel, both of Fleet, United Kingdom

[73] Assignee: The Secretary of State for Defence in Her British Majesty's Government of the United Kingdom of Great Britain and Northern Ireland, Hampshire, United Kingdom

[21] Appl. No.: 104,028

[22] Filed: Aug. 11, 1993

[30] Foreign Application Priority Data

Mar. 1, 1991 [GB] United Kingdom ......... 9104418

[51] Int. Cl.$^6$ ............................................. B32B 15/00
[52] U.S. Cl. ................................. 428/285; 428/284; 428/294; 428/298; 428/302; 428/367; 428/408; 428/416; 428/902; 428/283
[58] Field of Search ............ 428/284, 285, 294, 298, 428/302, 416, 408, 902, 367, 283

[56] References Cited

U.S. PATENT DOCUMENTS

| | | | |
|---|---|---|---|
| 4,888,247 | 12/1989 | Zweben et al. | 428/285 |
| 4,935,291 | 6/1990 | Gunnick | 428/213 |
| 5,153,057 | 10/1992 | Corbett et al. | 428/902 |

FOREIGN PATENT DOCUMENTS

| | | |
|---|---|---|
| 0056288A1 | 7/1982 | European Pat. Off. |
| 0322947A1 | 7/1989 | European Pat. Off. |
| 0469809A1 | 12/1991 | European Pat. Off. |

OTHER PUBLICATIONS

C. J. Peel et al: "Some Developments in the Performance of Lightweight Aerospace et al": 29 May 1991: pp. 191, 193 & 201.

Bull. Mater. Sci. vol. 13, No. 5, Dec. 1990, Bangalore pp. 305–311. "Preparation and Characterization of Aluminium Alloy Sheet Aramid et al".

Applied Materials Reserach, Oct. 1963, Forsyth et al, pp. 223–228 "Some Preliminary Tests on Aluminium Alloy Sheets Reinforced et al".

Primary Examiner—James J. Bell
Attorney, Agent, or Firm—Nixon & Vanderhye

[57] ABSTRACT

The stiffness of materials formed from aluminum alloy sheets laminated with layers of long aligned fibers embedded in a matrix of resin material is enhanced by reinforcing the aluminum alloy component with ceramic particles or whiskers. Use of stiff fibers such as carbon, aramid, alumina, silicon carbide or mixtures of these enables the stiffness of the fiber/resin component to be matched to that of the metal/ceramic component. This results in good fatigue crack growth resistance in the finished laminate, even for short crack lengths. In a preferred laminate, the metal/ceramic component is formed with a matrix of aluminum-lithium alloy. Such alloys are inherently stiffer than alloys without lithium, with the result that the increased stiffness obtained from ceramic reinforcement is enhanced stiff further.

10 Claims, 1 Drawing Sheet

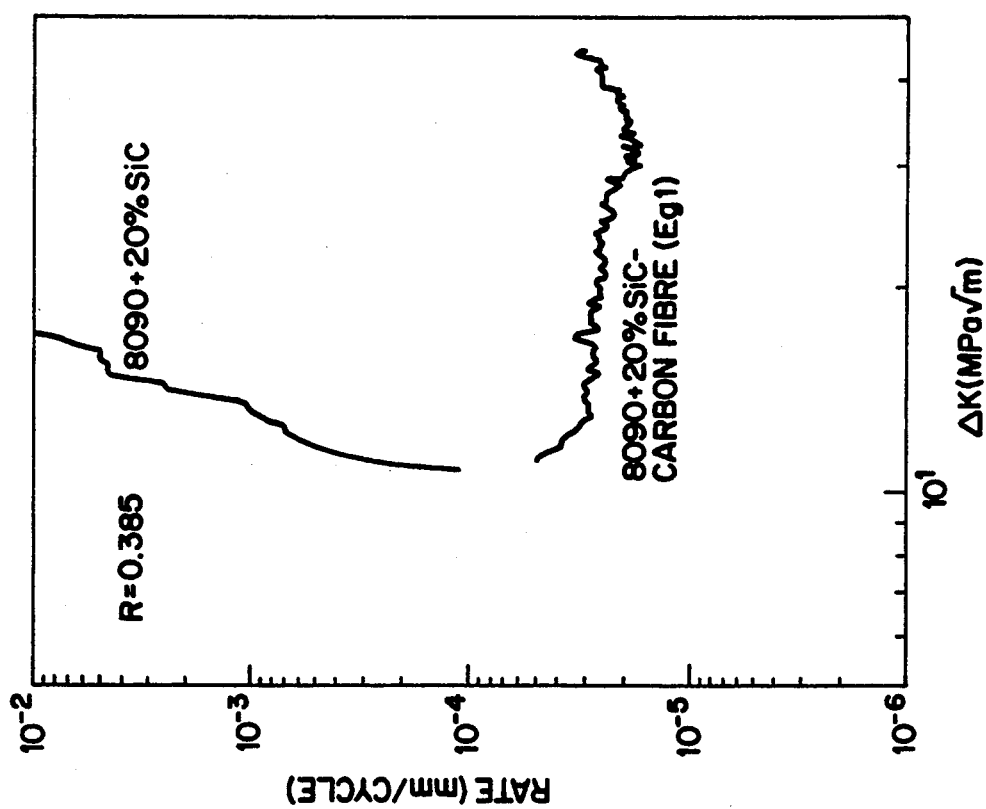
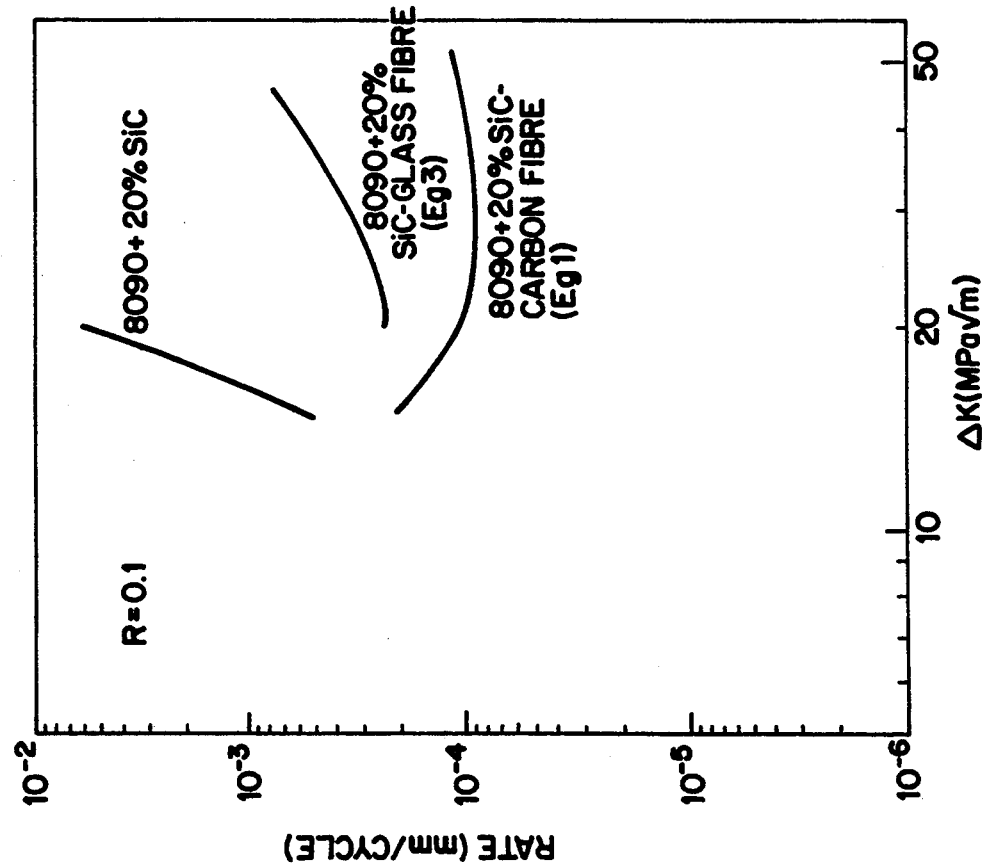

REINFORCED ALLOY LAMINATES

This invention relates to reinforced alloy laminates and in particular to laminates having reinforcements of long fibres embedded in a matrix of resin material which are adhesively bonded between layers of aluminium alloy.

Investigations have shown that such laminates exhibit improved damage tolerance compared to conventional high strength aluminium alloys in monolithic form. Coupled with their low density, this makes them particularly attractive for those aerospace applications where damage tolerance is a design requirement, for example in sections of pressure cabin or on the bottom surface of wings. This improved damage tolerance is manifested as an increase in resistance to fatigue crack growth, which is due to the restraint on the crack opening exerted by intact fibres in the wake of the crack.

This effect is only seen if "long" fibres are used, for example fibres having a minimum length of 10 mm, and in the text which follows references to "long" fibres should be construed accordingly. The effect is sensitive to fibre length because the mechanism of restraint requires effective load transfer during cracking from the metallic skin to underlying fibres in the interlayers. Short fibres or whiskers are unsuitable because many of them have insufficient length to span the cracks formed in the metal. Amongst those fibres which do bridge the cracks, many will have only a short length at their ends embedded in matrix material. This means they are susceptible to being pulled free of the matrix during crack propagation.

The orientation of fibres in a fibre-reinforced laminate may be varied to suit the particular engineering requirements of the end product. In the materials considered here, fibre orientations are pre-selected rather than random, enabling anisotropy in the end product to be controlled in a predictable fashion. Except in those circumstances where a specific fibre orientation has been adopted, for example in parallel with the rolling axis of the metal sheets, it is convenient to refer to the fibres merely as "aligned" and this terminology is used throughout the specification to distinguish the present materials from those with random fibre orientation.

The basic properties demanded of fibres for this task of crack restraint are strength under tension and minimal sensitivity to fatigue. Ideally, the resin interface between the fibres and the metal layers should be relatively weak in order to minimise fibre breakage in the wake of the crack. If this interface is too strong there is an increased likelihood of fibre fracture whenever the metal skin is stressed.

The effect of using thin fibre reinforcements in light alloy laminates was first investigated during the 1960s. One of the drawbacks of early materials of this type was the tendency of the thin aluminium sheets to undergo rapid initial cracking. These cracks would quickly grow to the point where sufficient crack-opening strains occurred to distribute load into the fibre reinforcement. This meant that the reinforcing layers were required to exert their beneficial effect much earlier than originally intended during the lifetime of the laminate, with the result that life expiry was also brought forward.

In spite of this difficulty, the results of work carried out at the Royal Aircraft Establishment by Forsyth, George and Ryder (reported in Applied Materials Research (1964) pages 223–8) indicated that good resistance to fatigue crack growth and good fracture toughness could nevertheless be achieved using steel wire reinforcement. Their materials still suffered from the rapid onset of initial cracking and the resultant cracks would still grow quickly to the point where the reinforcement shared the strain. However, once this condition had been reached, improvements in crack growth characteristics could be seen both in terms of a reduction in growth rate and also in respect of the length of cracks which could be tolerated before they became unstable.

In an effort to overcome this problem of initial cracking, Vogelesang and co-workers in European Patent Application 0 056 288 described the use of a prestressing technique which has much in common with the prestressing applied to reinforced concrete. Their method provides a compressive stress in the aluminium alloy sheets of the laminate and a sustained tensile stress in the reinforcing fibres. By maintaining the aluminium alloy sheets under compression, crack initiation is inhibited. In comparison to monolithic alloys, this leads to good overall tensile properties, particularly in the fibre direction, but compressive strength and resistance to buckling are reduced because of the poor compression performance of the fibre-reinforced non-metallic layers.

Another disadvantage of the prestressing route is the high cost of manufacture, since this is carried out on a sheet-by-sheet basis. Not only is this much more expensive than continuous production, but it also leads to problems of non-uniformity in the stressing: If inconsistent properties are introduced into the resultant laminate, such as variations in strains across a sheet or possibly from one sheet to another, variable residual stresses and non-uniform mechanical properties may arise in the finished article. In addition, unless the applied prestressing is adequate, resistance to initiation of fatigue cracks is little better than in corresponding unstressed laminates because the load during initial cracking is borne predominantly by the metallic layers.

Moreover, alloy laminates in general fail to achieve their maximum potential weight saving because they cannot be made sufficiently thin. At the minimum gauge of aluminium sheet which has sensible handling characteristics, the strength requirement of the laminate is exceeded. The expected weight saving cannot be achieved unless thinner aluminium sheets are used. However, these are too fragile in compression to offer sufficient buckling resistance and in any case production becomes hampered by handling difficulties.

It is therefore an aim of this invention to overcome many of these difficulties by providing a fibre-reinforced alloy laminate which exhibits improved fracture toughness together with improved resistance to fatigue crack initiation and growth without recourse to prestressing, and which also exhibits improved compression performance compared to known aluminium alloy laminate materials.

The invention is a fibre-reinforced aluminium alloy bonded laminate material comprising at least two aluminium alloy sheets in which each sheet is separated from adjacent sheets by an interlayer of a fibre-reinforced composite material comprising long, aligned reinforcing fibres embedded in a matrix of resin material, characterised in that the aluminium alloy sheets are formed of a metal matrix composite material containing reinforcements of a ceramic component comprising particles or whiskers and in that the fibres in the fibre-reinforced composite material are of a sufficient stiffness that the modulus of elasticity of the fibre-reinforced composite material is at least as great as that of the metal matrix composite sheets.

The ceramic component reinforcement serves to increase the stiffness of the aluminium alloy sheets. This means that sheets of equivalent thickness to their monolithic counterparts can be used to increase the resistance to buckling of the laminate. Alternatively, thinner sheets can be used to achieve an overall weight saving.

In practice, there is very little difference between the benefit derived from whisker reinforcement or that obtained from particles.

In a preferred form of the invention, the aluminium alloy sheets are formed from an aluminium alloy containing 1 to 3% lithium in proportions by weight. Typically, the metal matrix composite sheets made from such an alloy have a modulus of elasticity of 90 to 100 GPa. Especially preferred is an aluminium-lithium alloy of the type designated as 8090 by the Aluminum Association of America. Such alloys have a nominal composition of 2.2 to 2.7% Li; 1.0 to 1.6% Cu; 0.6 to 1.3% Mg: 0.04 to 0.16% Zr: up to a maximum of 0.20% Si and up to a maximum of 0.30% Fe expressed in proportions by weight, with the balance being aluminium save for incidental impurities. The use of an aluminium-lithium alloy confers the advantage of reduced weight in comparison to panels of equivalent thickness formed from conventional alloys of the 2000 or 7000 series (also designations of the Aluminum Association of America). At lithium levels of 2.5% by weight, which is a typical value For aluminium-lithium alloys of the 8090 type, the weight saving is approximately 10%. An additional benefit of using an aluminium-lithium alloy is that it is inherently stiffer than its non-lithium-containing counterpart. As before, this increase in stiffness can be used to the advantage of the aerospace designer and may help to alleviate some of the difficulties encountered in handling very thin sheets.

The physical characteristics required of the reinforcing fibres are high strength combined with low density and high modulus of elasticity. Suitable candidates include fibres of carbon, polyaromatic amide (aramid), alumina and silicon carbide, or mixtures of these. Both alumina and silicon carbide fibres combine high stiffness with the added advantage of low chemical reactivity, but they are inferior to carbon fibres in terms of brittleness. In practice, the high cost of alumina and silicon carbide fibres means that they are only likely to be used for those applications in which low chemical reactivity brings appreciable benefits, for example where it is important to minimise the incidence of galvanic corrosion.

It is important that the stiffness of the composite material used in the non-metallic layers should be optimised in relation to the stiffness of the metallic layers. This ensures that a sensible distribution of load occurs between the aluminium alloy layers and the fibre-reinforced interlayers. In practice this is achieved by using composite material having a stiffness slightly in excess of the metallic component, which results in an improvement in fatigue crack growth resistance even for short crack lengths. However, the composite material should not be vastly stiffer than the metallic component, otherwise it will be subjected to the major proportion of the load. This is just as undesirable as the situation in which the load is borne predominantly by the metallic layers. Preferably, the composite material has a modulus of elasticity up to 50% higher than that of the metallic components.

Experiments with glass fibre reinforcements confirm that it is essential to coordinate the modulus of elasticity of the composite material in the non-metallic layers with that of the aluminium alloy layers to achieve the maximum benefit of the invention. Whilst laminates having glass fibre reinforcements have shown some improvement in fatigue crack growth resistance compared with the corresponding monolithic alloy, this is only seen with longer crack lengths. This evidence suggests that the modulus of elasticity of glass fibres is too low for them to have an effect on short cracks.

In materials which use carbon fibres as the reinforcing component, it has been found that best results are achieved if intermediate modulus fibres are employed, by which is meant fibres having a modulus of elasticity in the range 200 to 300 GPa. When such fibres are embedded in a matrix of resin material, the approximate modulus of the resulting composite material may be estimated by ignoring the contribution of the resin and multiplying the modulus of the fibre component by the fibre volume fraction. Thus a composite material formed with a 60% volume fraction of fibres having a modulus of, say, 230 GPa would have a modulus of $230 \times 0.6$, i.e. 138 GPa.

The invention will now be described in more detail with reference to the following examples and the drawings, in which:

BRIEF DESCRIPTION OF THE DRAWINGS

FIG. 1 is a comparison between the fatigue crack resistances of laminated materials constructed according to the invention and an unlaminated metal matrix composite material, and FIG. 2 is a similar comparison between the fatigue crack resistances of some of the materials used in FIG. 1, but under different experimental conditions.

EXAMPLE 1

A metal matrix composite consisting of 8090 aluminium-lithium alloy which has a nominal composition Al-2.5 Li-1.2 Cu-0.7 Mg-0.2 Zr and containing 20% by weight of silicon carbide particles (average particle size 3 μm) was hot-rolled to a thickness of 0.5 mm.

Two pieces of this sheet were homogenised for 15 minutes at 535° C. and cold water quenched. After degreasing the sheets were etched and anodised in chromic acid in accordance with published U.K. Defence Standards 03-2/1 and 03-24/issue 2 to promote interlayer bonding.

A three layer laminate comprising two skins of the metal matrix composite sheets prepared as above with an interlayer of Grafil XAS carbon fibre-epoxy prepreg was laid up with the fibres aligned along the rolling direction of the metal matrix composite sheets. This was cured in an autoclave for 1 hour at 120° C. under a pressure of 700 kPa. Grafil XAS is an intermediate modulus carbon fibre. The prepreg was supplied by Ciba-Geigy and comprised roughly 60% by volume of fibres in a matrix of Fibredux 913, a proprietary modified epoxy resin.

The curing process also served as an aging treatment for the aluminium-lithium alloy in the two outer layers of the laminate.

In Table 1 below, the mechanical properties of the above laminate are compared for measurements made along and across the fibre direction. Whilst some degree of anisotropy is evident, the inherent stiffness of the metal matrix composite helps to maintain the properties of the laminate within acceptable limits in the direction transverse to the fibre orientation.

EXAMPLE 2

A three layer laminate comprising two skins of the metal matrix composite sheets prepared as in Example 1 above with an interlayer of Kevlar 49-epoxy prepreg was laid up and cured as previously. (Kevlar is a Registered Trade Mark). The volume fraction of fibres in this Example was 50%, otherwise the material was prepared to correspond as nearly as possible to the laminate of Example 1, using the same epoxy resin matrix and identical curing conditions. The fatigue performance of this Example is compared with that of other laminates in FIG. 1.

TABLE 1

A comparison of mechanical properties measured along and across the fibres in a three-layer laminate constructed according to the invention

| PROPERTY DIRECTION | PARALLEL TO FIBRES | PERPENDICULAR TO FIBRES |
|---|---|---|
| Young's Modulus (GPa) | 92 | 79 |
| Tensile Strength (MPa) | 607 | 338 |
| Extension to failure (%) | 2.5 | 2.0 |
| 0.2% Proof Stress (MPa) | 387 | 267 |

EXAMPLE 3 (COMPARATIVE)

A three layer laminate comprising two skins of the metal matrix composite sheets prepared as in Example 1 above with an interlayer of E glass fibre-epoxy prepreg was laid up and cured as previously. The volume fraction of fibres in this Example was 60%. Its fatigue performance is compared with that of other laminates in FIG. 1.

The epoxy resin prepreg employed in the Examples was of a type which requires no additional adhesive to effect bonding to the metallic layers. It will be understood, however, that alternative systems may require a separate application of adhesive.

The ceramic component in the aluminium-lithium alloy sheets preferably comprises between 10 and 30% by weight, especially between 15 and 25% by weight. The weight proportion of ceramic reinforcement used in the Examples above was 20%, corresponding to a volume fraction of approximately 17%. Whilst this gave a very good improvement in fatigue performance, the higher proportions of ceramic component have been found to cause a decrease in ductility in the alloy sheets.

In these circumstances thermomechanical treatments can sometimes be used to obtain useful ductilities.

FIGS. 1 and 2 show comparisons between the fatigue crack resistances of some of the laminate materials prepared in the Examples above and samples of unlaminated metal matrix composite material. The rates of fatigue crack growth were determined from sheet panels measuring 380 mm × 152 mm each having a central slot of 10 mm length extending transversely to the fibre direction, using a pulsed potential drop method to monitor crack growth. The test panels were consistently loaded in the longitudinal direction at stress ratios of 0.1 (FIG. 1) and 0.385 (FIG. 2) with mean stresses of 70 MPa and 90 MPa, respectively. Both Figures show that the rate of crack growth in the unlaminated sample of metal matrix composite material is much greater than that for the laminated materials. Indeed, in the carbon fibre-reinforced laminate, the rate of crack growth appears to decrease slightly after initial stressing and thereafter remains fairly constant over a wide spread of stress intensity factor (Delta K).

In Table 2 below, the stiffness parameters are compared for a series of aluminium based alloys, composites and laminates. This illustrates the improvement in properties which can be achieved, not only by incorporating ceramic reinforcements in the aluminium alloy matrix but also by adopting an aluminium-lithium alloy as the metallic component. Even though the metal matrix composite has a higher density than the parent aluminium-lithium alloy upon which it is based, the table shows that the composite material has a higher specific stiffness which results in an improved buckling performance 20% better than for plain aluminium sheet without lithium. Similarly,

TABLE 2

Stiffness parameters for various aluminium-based alloys, composites and laminates

| PROPERTY MATERIAL | 2024 Al Alloy | 8090 Al—Li Alloy | 8090 Al—Li Alloy + 20% SiC particles | 3-layer laminate of 2024 Al Alloy with aramid fibre/epoxy interlayer | 3-layer laminate 2090 Al—Li Alloy with aramid fibre/epoxy interlayer | 3-layer laminate 8090 Al—Li Alloy + 20% SiC particles with carbon fibre/epoxy interlayer |
|---|---|---|---|---|---|---|
| Relative Density ($\rho$) | 2.80 | 2.53 | 2.65 | 2.45 | 2.39 | 2.38 |
| Young's Modulus (E), GPa | 72 | 80 | 105 | 68 | 73 | 92 |
| E/$\rho$ | 25.7 | 31.6 | 39.6 | 27.8 | 30.5 | 38.7 |
| Improvement in bending (E/$\rho$)* | — | 23% | 54% | 8% | 19% | 51% |
| $E^{\frac{1}{3}}/\rho$ | 1.49 | 1.70 | 1.78 | 1.67 | 1.75 | 1.90 |
| Improvement in buckling ($E^{\frac{1}{3}}/\rho$)* | — | 14% | 20% | 12% | 17% | 28% |

*Relative to 2024 Al Alloy in laminated form using an interlayer of carbon fibres embedded in an epoxy resin matrix, the improvement in buckling approaches 30%.

Although the present invention has been particularly described with reference to metal matrix composites of aluminium-lithium alloys, other modifications may be apparent to those skilled in the art without departing from the scope of the claims which follow.

We claim:

1. A fibre-reinforced aluminium alloy bonded laminate material comprising at least two aluminium alloy sheets in which each sheet is separated from adjacent sheets by an interlayer of a fibre-reinforced composite material comprising long, aligned reinforcing fibres embedded in a matrix of resin material, characterised in that the aluminium alloy sheets are formed of a metal matrix composite material containing reinforcements of a ceramic component comprising particles or whiskers and in that the fibres in the fibre-reinforced composite material are of a sufficient stiffness that the modulus of elasticity of the fibre-reinforced composite material is at least as great as that of the metal matrix composite sheets.

2. A fibre-reinforced alloy laminate material as claimed in claim 1 further characterised in that the aluminium alloy has a lithium content of 1 to 3% in proportions by weight.

3. A fibre-reinforced alloy laminate material as claimed in claim 2 further characterised in that the aluminium-lithium alloy is of a type designated as AA8090 by the Aluminum Association of America having a nominal composition of 2.2 to 2.7% Li; 1.0 to 1.6% Cu; 0.6 to 1.3% Mg; 0.04 to 0.16% Zr; up to a maximum of 0.20% Si and up to a maximum of 0.30% Fe expressed in proportions by weight, with the balance being aluminium save for incidental impurities.

4. A fibre-reinforced alloy laminate material as claimed in claim 1 further characterised in that the reinforcing fibres are selected from the group comprising carbon, polyaromatic amide, alumina and silicon carbide fibres, or mixtures thereof.

5. A fibre-reinforced alloy laminate material as claimed in claim 1 further characterised in that the composite material has a modulus of elasticity up to 50% higher than that of the aluminium alloy sheets.

6. A fibre-reinforced alloy laminate material as claimed in claim 1 further characterised in that the ceramic component constitutes from 10 to 30% by weight of the aluminium alloy sheets.

7. A fibre-reinforced alloy laminate material as claimed in claim 6 further characterised in that the ceramic component constitutes from 15 to 25% by weight of the aluminium alloy sheets.

8. A fibre-reinforced alloy laminate material as claimed in claim 7 further characterised in that the ceramic component constitutes 20% by weight of the aluminium alloy sheets.

9. A fibre-reinforced alloy laminate material as claimed in claim 1 further characterised in that the ceramic component comprises particles of average particle size 3 μm.

10. A fibre-reinforced alloy laminate material as claimed in claim 1 being a fatigue resistant material, further characterised in that the metal matrix composite sheets are comprised of an aluminium-lithium alloy and have a modulus of elasticity of 90 to 110 GPa and in that the fibre/resin composite material is comprised of intermediate modulus carbon fibres.

* * * * *

UNITED STATES PATENT AND TRADEMARK OFFICE
CERTIFICATE OF CORRECTION

PATENT NO. : 5,403,653 Page 1 of 1
DATED : April 4, 1995
INVENTOR(S) : Moreton et al.

It is certified that error appears in the above-identified patent and that said Letters Patent is hereby corrected as shown below:

Title page,
Item [22], PCT Filed: should read -- February 27, 1992 --.
Insert Items:
-- [86]  PCT No.: PCT/GB92/00351

§371 Date: August 11, 1993

§102(e) Date: August 11, 1993

[87]  PCT Pub. No. WO 92/15453

PCT Pub. Date: 17 September 1992 --.

Signed and Sealed this

Twenty-fourth Day of January, 2006

JON W. DUDAS
*Director of the United States Patent and Trademark Office*